Jan. 16, 1940.  L. W. FAULKNER  2,187,117
WINDSHIELD WIPER ACCESSORY
Filed Oct. 20, 1937
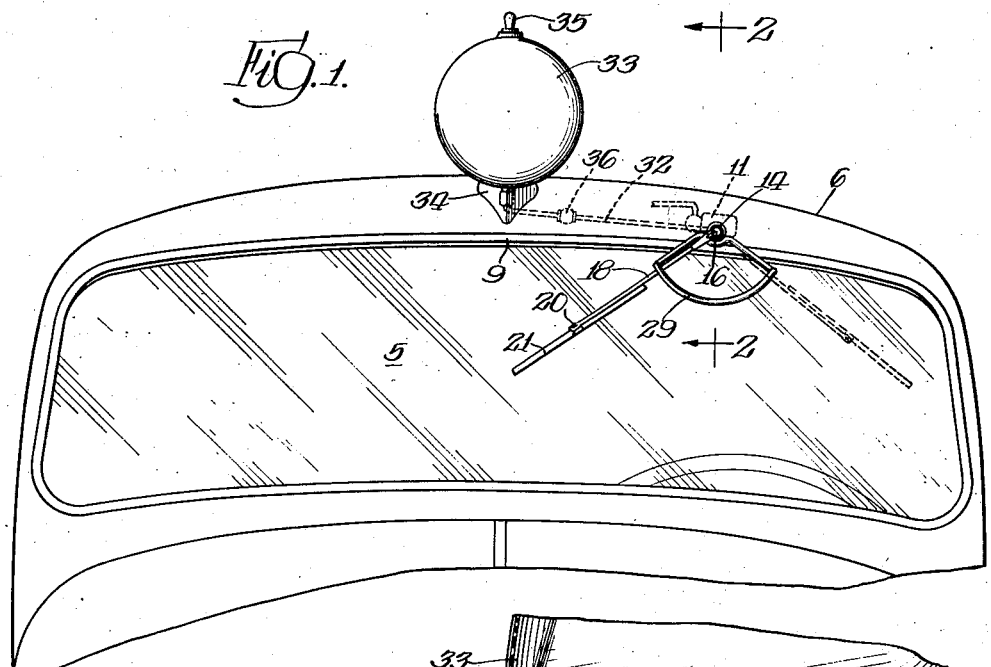
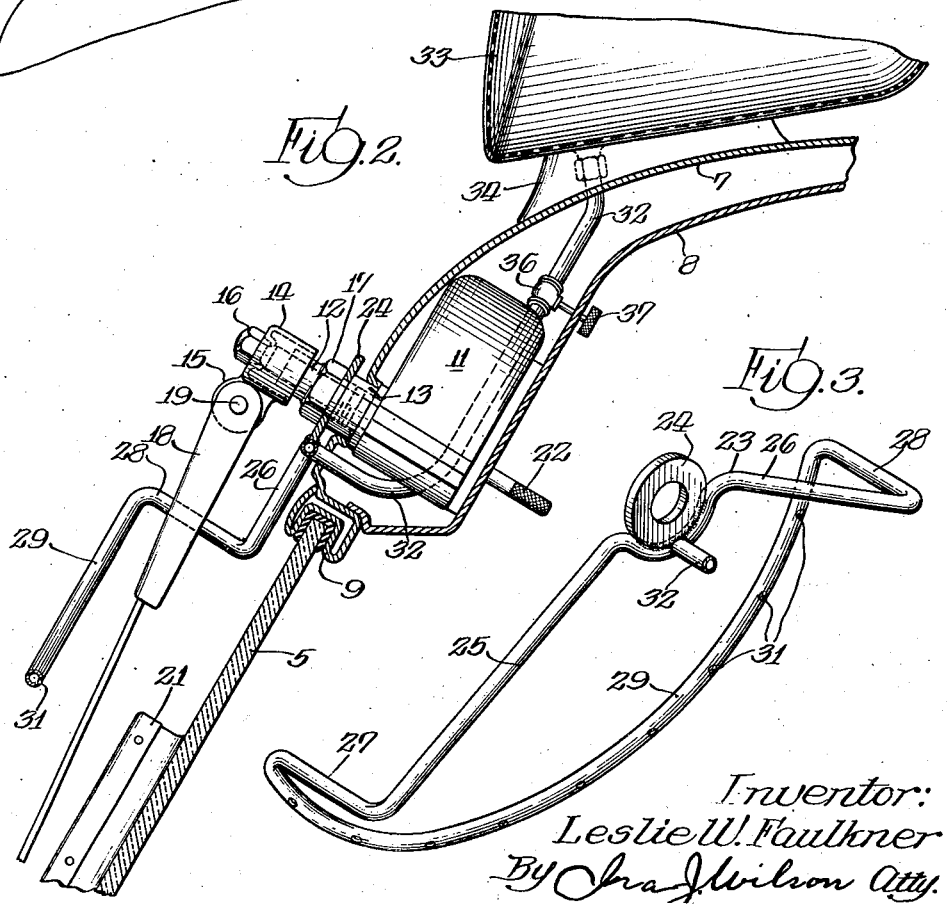
Inventor:
Leslie W. Faulkner
By Ira J. Wilson Atty.

Patented Jan. 16, 1940

2,187,117

UNITED STATES PATENT OFFICE 2,187,117

WINDSHIELD WIPER ACCESSORY

Leslie W. Faulkner, Champaign, Ill.

Application October 20, 1937, Serial No. 169,981

5 Claims. (Cl. 15—250)

This invention relates in general to automobile accessories and more particularly to a device adapted for use in connection with the windshield wiper for limiting the movements of the wiper arm so as to preclude it from assuming inoperative positions and for supplying at will a liquid to the surface of the windshield over which the wiper travels to thereby assist in the removal therefrom of dirt, mud, insects, and the like which tend to accumulate thereon and to assist in maintaining the surface clear from accumulations of snow, sleet, and the like.

In the operation of windshield wipers of the oscillatory arm type, such arms not infrequently when operating at high speed overthrow their normal path of travel and become lodged upon the windshield frame so that further operation is impossible until the driver disengages and releases the stuck wiper. One of the purposes of my present invention is to obviate such overthrowing and sticking of the wiper by the provision of a device which confines the travel of the wiper arm within workable limits.

In devices of this type, the wiper arm is pivotally mounted on a stub arm carried by an oscillatory shaft and is yieldingly urged about its pivot into wiping relation with the windshield surface by a spring. The wiper blade or squeegee is detachably pivoted to the free end of the wiper arm, the connection, however being such that the blade can be detached only when the free end of the arm is swung outwardly some distance away from the windshield. The ready detachability of the blade affords an inducement for petty thievery thereof, particularly by children.

Another purpose of my invention is to prevent such thievery by providing a guard which precludes the swinging or tilting of the wiper arm into a position permitting detachment of the wiper blade therefrom.

Another purpose of my invention is to provide for the distribution of a liquid over the surface of the windshield upon which the wiper operates to thereby assist in the removal of dirt, mud, insects, and the like therefrom and also to assist in maintaining the windshield clear from accumulations of snow, sleet, and the like in stormy weather.

Other objects and many of the attendant advantages of my invention should be readily appreciated when the same becomes better understood by reference to the following description when considered in connection with the accompanying drawing.

Referring to the drawing,

Fig. 1 is a fragmentary front elevation of a car equipped with my invention;

Fig. 2 is a sectional view on the line 2—2 of Fig. 1; and

Fig. 3 is a perspective view of the combined guard and liquid distributor.

Referring to the drawing more in detail, reference character 5 indicates generally a windshield and 6 the top of a car body which in modern construction comprises the outer wall 7 and the inner wall 8 joined at their lower edges and shaped to provide a channel 9 constituting the windshield frame.

The windshield wiper motor 11, which may be either of the pneumatic or electric type, is mounted between these walls above the windshield, as shown, the motor being adapted to oscillate a shaft 12 projecting outside the body through a boss 13 formed rigidly with the motor casing. The hub 14 of a stub arm 15 is mounted upon the projecting end of the shaft 12 and is secured in position thereon by a nut 16. A tubular bearing member having an intermediate head 17 is threaded into the boss 13 and forms an elongated bearing for the shaft 12. A wiper arm 18 is pivotally attached to the stub arm 15 by a pintle 19 and is held in operative position to press the wiper blade 21 against the face of the windshield by a spring (not shown). The motor may be controlled by a controller 22 of usual construction disposed in position accessible to the driver.

The construction thus far described may be of standard or other preferred type, since the details thereof are immaterial insofar as my present invention is concerned.

The wiper blade or squeegee 21 is detachably connected to the outer end of the wiper arm 18 by a standard connection 20 of well known construction, which permits detachment of the blade from the arm only when the arm has been swung outwardly about its pivot a sufficient distance to permit the wiper to be disposed substantially at right angles to the arm.

For the purpose of limiting the swinging movements of the wiper arm so as to prevent it from overthrowing and becoming lodged upon the windshield frame or the car top, my invention contemplates the provision of a guard shaped substantially as shown in Fig. 3 and designated generally by reference character 23, the guard including in its construction an annular washer-shaped member 24 adapted to pass over the shaft 12 and receive the threaded end of the shaft bearing so as to be rigidly clamped in position against the outer end of the boss 13 by the clamp nut 17. The diverging legs 25 and 26 of the guard terminate in outwardly projecting abutment members 27 and 28, respectively, which are connected by an elongated element 29 adapted to be disposed over the wiper arm 18 when the guard is mounted in the operative position shown in Figs. 1 and 2. It will be obvious from these figures that the abutment members 27 and 28 are disposed in the extended path of travel of the wiper arm and serve to confine the movements of said arm within the desired operative limits and preclude overthrow or excessive movements of the arm in either direction, thereby precluding the same from becoming lodged upon the windshield frame or the car top. It will likewise be apparent that the element 29 overlies the path of travel of the arm 18 and prevents upward swinging movements of this arm away from the windshield into a position which would permit detachment of the wiper blade therefrom, thereby preventing the petty thievery of these blades, which has become rather prevalent.

For the purpose of distributing liquid, either in the form of water or some preferred non-freezing solution, over that surface of the windshield upon which the wiper operates, the guard 23 is formed of round or flat tubular construction and the element 29 thereof is provided with a series of spaced apart apertures 31 opening toward the windshield to direct and distribute liquid against the windshield surface. Such liquid is supplied to the tubular guard member through a supply pipe 32 extending between the walls of the top from the guard to a tank or reservoir 33 mounted in any convenient location. In the present instance the tank is shown as carried by a base 34 mounted upon the top 6 and is provided with a vent 35 to enable the liquid to flow by gravity from the tank to the distributing guard, the vent or a filling plug being removable to enable the tank to be filled. Should it be considered preferable to locate the tank in an inconspicuous position below the level of the distributing guard, a pump of any suitable construction, electrically or otherwise operated, may be employed for delivering the liquid from the tank to the point of distribution. In the present embodiment of the invention, in which for simplicity gravity is relied upon for distribution of the liquid, the supply of said liquid to the guard may be controlled by a valve 36 in the pipe 32, the stem of which is equipped with an operating knob 37 located in a position accessible to the driver. Upon opening this valve, the liquid will be delivered from the apertures 31 against the face of the windshield to assist the wiper in maintaining a clear vision space for the vehicle occupants.

It is believed that my invention, its mode of operation and the advantages possessed thereby will be apparent from the foregoing without further description, but it should be manifest that the structural details illustrated and described are exemplary only of the principles of my invention and may be varied within wide limits without departing from the scope of the invention as defined in the following claims.

I claim:

1. The combination with a windshield wiper including an oscillatory shaft, a stub arm fixedly mounted thereon, a wiper arm pivoted to said stub arm and a wiper blade carried by said wiper arm, of a tubular guard member stationarily mounted with respect to said wiper and comprising a frame providing spaced apart abutments for limiting the oscillatory movements of said wiper arm and a connecting portion overlying said arm and provided with apertures, and means for supplying liquid to said guard member.

2. The combination with a windshield wiper including an oscillatory shaft, a support therefor, a wiper arm pivoted to said shaft and movable therewith and a wiper blade carried by said wiper arm, of a guard arm stationarily mounted upon said support and comprising a sector shaped frame providing spaced apart abutments for limiting the oscillatory movements of said wiper arm and a guard for said arm connecting said abutments and disposed adjacent to the path of travel of said arm to limit the outward movement of said arm away from the windshield.

3. The combination with a windshield wiper including an oscillatory shaft, a wiper arm connected thereto and a wiper blade carried by said arm in position to engage a windshield, of a generally sector shaped, tubular guard member fixedly mounted concentrically with the shaft and comprising diverging supporting portions disposed in a plane between the arm and the windshield, portions extending outwardly away from the windshield at opposite sides of the arm providing abutments limiting the lateral movements of said arm and a portion connecting the outwardly extending portions and positioned more remote from the windshield than said arm so as to limit outward movement thereof, said connecting portion being provided with downwardly directed openings, and means for supplying fluid to said guard for delivery through said openings against the windshield.

4. The combination with a windshield wiper including an oscillatory shaft, a wiper arm connected thereto and a wiper blade carried by said arm, of a generally sector shaped guard member comprising fixedly mounted supporting portions outwardly extending portions at opposite sides of the guard providing abutments to limit the lateral movements of said arm, and a portion connecting the outwardly extending portions to limit outward movement of the arm.

5. A sector shaped guard for a windshield wiper arm comprising a supporting head portion, a pair of members diverging from said head portion in a common plane, each of said members being bent near its outer end to provide a pair of spaced apart abutments extending from said plane, and a connection between said abutments extending parallel with and spaced from the plane of said members.

LESLIE W. FAULKNER.